(12) United States Patent
Qiu et al.

(10) Patent No.: US 7,894,073 B2
(45) Date of Patent: Feb. 22, 2011

(54) BIAS-INSTABILITY REDUCTION IN FIBER OPTIC GYROSCOPES

(75) Inventors: Tiequn Qiu, Glendale, AZ (US); Steven J. Sanders, Scottsdale, AZ (US); Sorin Mosor, Peoria, AZ (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/848,592

(22) Filed: Aug. 2, 2010

(65) Prior Publication Data

US 2010/0316332 A1      Dec. 16, 2010

Related U.S. Application Data

(63) Continuation of application No. 12/187,932, filed on Aug. 7, 2008, now Pat. No. 7,777,889.

(51) Int. Cl.
   *G01C 19/72* (2006.01)
(52) U.S. Cl. ....................................... 356/460
(58) Field of Classification Search .................. 356/460
   See application file for complete search history.

(56) References Cited

U.S. PATENT DOCUMENTS

| | | | |
|---|---|---|---|
| 5,031,988 A | 7/1991 | Okada | |
| 5,260,768 A * | 11/1993 | Cordova et al. | 356/460 |
| 5,327,213 A | 7/1994 | Blake | |
| 5,365,338 A | 11/1994 | Bramson | |
| 5,386,290 A | 1/1995 | Okada | |
| 5,602,642 A | 2/1997 | Bergh et al. | |
| 5,767,970 A | 6/1998 | Cordova | |
| 5,818,590 A | 10/1998 | Patterson | |
| 5,847,829 A | 12/1998 | Cordova | |
| 6,040,908 A | 3/2000 | Rahn | |
| 6,801,319 B2 | 10/2004 | Szafraniec et al. | |
| 6,978,056 B2 | 12/2005 | Tavlykaev | |
| 7,317,847 B1 | 1/2008 | Wang | |
| 2007/0097374 A1* | 5/2007 | Ren-Young | 356/460 |
| 2010/0033729 A1 | 2/2010 | Qiu | |

* cited by examiner

Primary Examiner—Patrick J Connolly
(74) Attorney, Agent, or Firm—Fogg & Powers LLC

(57) ABSTRACT

Apparatus for providing Bias-Instability reduction in Fiber Optic Gyroscopes are provided. In one embodiment, an optical circuit for a fiber optic gyroscope having a broadband light source and an optical fiber loop comprises: a PM fiber of length v; an IOC coupled to the PM fiber via a pigtail of length $d_1$, a second pigtail with length of $d_2$, and a third pigtail with length of $d_3$; a splitter that splits light received from the first pigtail into a first and second beams directed to the second and third pigtails; and a depolarizer circuit coupled to said fiber loop including a first fiber section of length x, a second fiber section of length z, a third fiber section of length w and a fourth fiber section of length y; and wherein the lengths of v, x, y, $d_1$ and $d_3$ are proportioned to avoid regions of high bias instability.

20 Claims, 11 Drawing Sheets

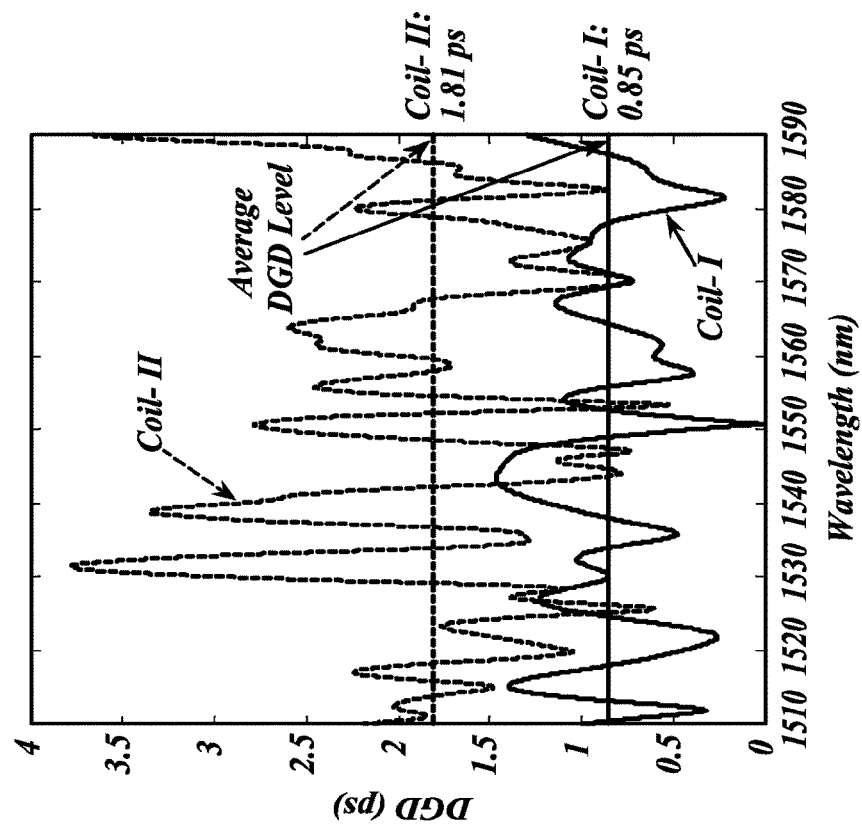
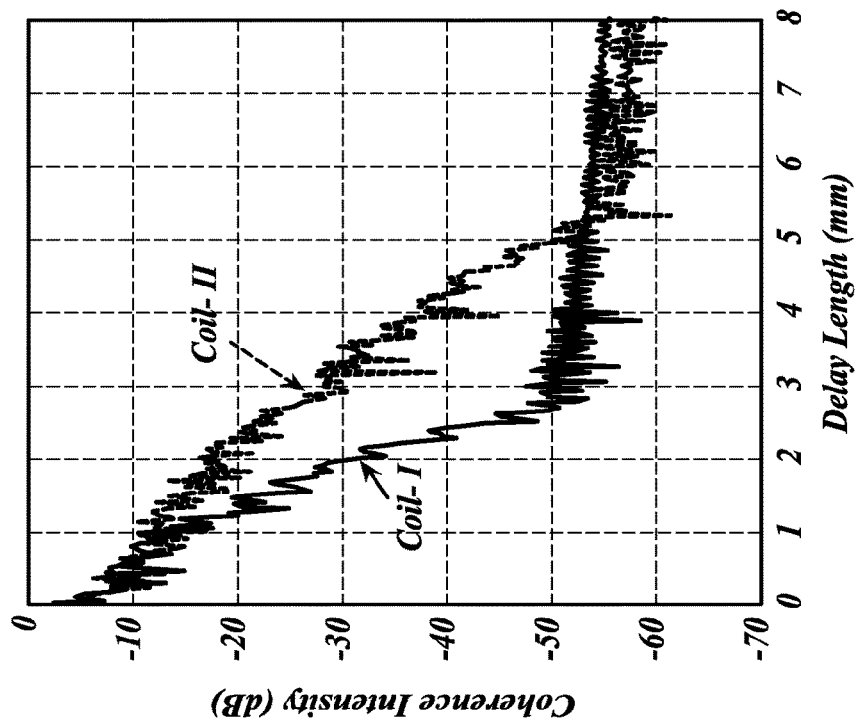
FIG. 3b
FIG. 3a

BIAS-INSTABILITY REDUCTION IN FIBER OPTIC GYROSCOPES

CROSS-REFERENCE TO RELATED APPLICATIONS

The present application is a continuation of, and claims priority to, U.S. patent application Ser. No. 12/187,932 (hereafter "the '932 Application"), entitled "BIAS-INSTABILITY REDUCTION IN FIBER OPTIC GYROSCOPES" filed on Aug. 7, 2008.

GOVERNMENT LICENSE RIGHTS

The U.S. Government may have certain rights in the present invention as provided for by the terms of a Government Contract No. N00030-08-C-0010 with the U.S. Navy.

BACKGROUND OF THE INVENTION

In a fiber optic gyroscope, polarization errors result from interference between the primary lightwaves and spurious lightwaves, as well as interference among spurious lightwaves. The weak spurious lightwaves come from polarization cross-couplings at non-ideal fiber splices, in birefringent coil fiber, at junctions between integrated optical circuit (IOC) waveguides and its pigtail fibers, and inside optical components. These spurious lightwaves reaching the photodetector carry erroneous Sagnac phase information because they traveled nonreciprocal paths in the sensing loop. Methods of using Lyot-type fiber depolarizers and tailoring of the depolarizer polarization maintaining (PM) fiber lengths have been suggested to mitigate polarization errors. In prior art polarization error models, the polarization errors are evaluated in the time domain by keeping track of time and phase delays of spurious lightwaves originating from cross-couplings in the optical circuit. Wavelength dependent properties of the optical component, such as polarization dependent loss (PDL), polarization mode dispersion (PMD), etc., are often completely or partially ignored in the model. Specifically, for a depolarized gyroscope using a non-polarization maintaining single-mode (SM) fiber coil, the impact of the SM coil birefringence on the polarization error is empirically taken into account by assuming a broadened light source coherence function. Such simplifications lead to inaccuracies (up to one order of magnitude of deviation) in evaluation of polarization errors. More accurate modeling methods are needed to find optimal design parameters of interferometric fiber optic gyroscopes with reduced polarization error and bias instability.

SUMMARY

In one embodiment, an optical circuit for a fiber optic gyroscope having a broadband light source and a single mode optical fiber loop comprises: a polarization maintaining (PM) delay management fiber of length v, having a first end and a second end, wherein the first end of the polarization maintaining delay management fiber is coupled a directional coupler that receives light from the broadband light source; an integrated optical circuit (IOC) having the integrated optical circuit coupled to the second end of the polarization maintaining delay management fiber via a first polarization maintaining fiber pigtail of length $d_1$; the integrated optical circuit coupled to a second polarization maintaining fiber pigtail with length of $d_2$; and the integrated optical circuit coupled to a third polarization maintaining fiber pigtail with length of $d_3$; wherein the integrated optic circuit (IOC) comprises a polarization maintaining waveguide device having waveguide length of $L_{IOC}$ and comprise a polarizing element so that the total effective polarization extinction ratio (PER) of the integrated optic circuit is $\epsilon$. The circuit further comprises a splitter that splits light received from the first polarization maintaining fiber pigtail into a first beam directed to the second polarization maintaining fiber pigtail and a second beam directed to the third polarization maintaining fiber pigtail; and a depolarizer circuit coupled to said fiber loop, said depolarizer region including a first optical fiber section of length x, a second optical fiber section of length z, a third optical fiber section of length w and a fourth optical fiber section of length y, each comprising polarization maintaining fibers having a beat length of $L_B$; wherein the second optical fiber section is coupled to the first optical fiber section via a first splice, the first optical fiber section is coupled to a first end of the single mode optical fiber loop via a second splice, the fourth optical fiber section is coupled to the third optical fiber section via a third splice, and the third optical fiber section is coupled to a second end of the single mode optical fiber loop via a fourth splice; and wherein x+z is substantially equal to w+y; wherein the lengths of v, x, y, $d_1$ and $d_3$ are proportioned to avoid regions of high bias instability defined by the expressions $v=x-(L_{IOC}+y+d_1+d_3)$, $v=2x-(L_{IOC}+y+d_1+d_3)$, $v=3x-(L_{IOC}+y+d_1+d_3)$, and $v=4x+y-(L_{IOC}+y+d_1+d_3)$.

BRIEF DESCRIPTION OF THE DRAWINGS

Preferred and alternative embodiments of the present invention are described in detail below with reference to the following drawings.

FIGS. 3a and 3b illustrate two coil coherence functions and their associated wavelength dependent differential group delays (DGDs) in accordance with an embodiment of the present invention;

DETAILED DESCRIPTION

Figure 11:
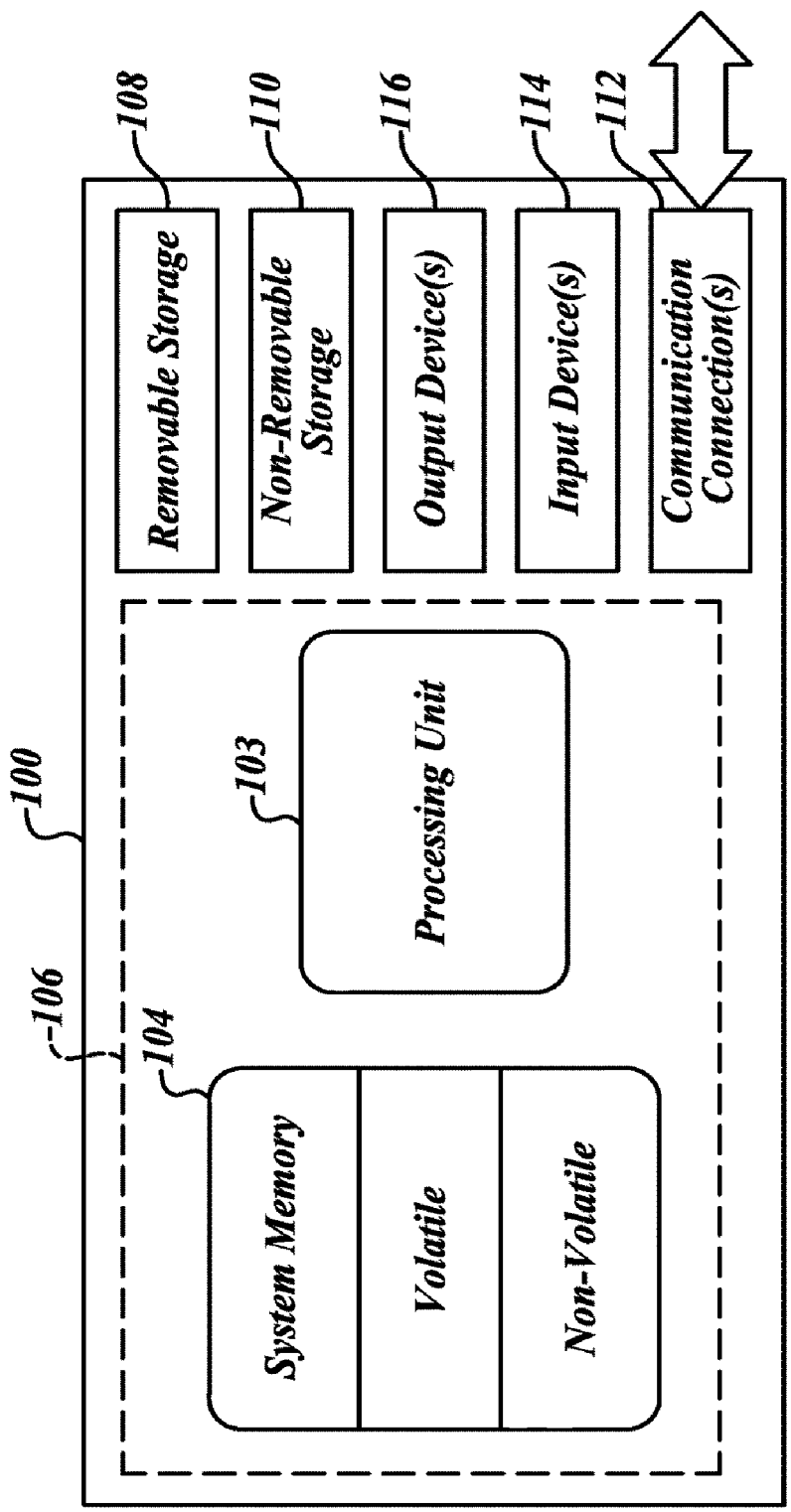
FIG. 11 illustrates an operating environment in which an embodiment of the invention can be implemented.

FIG. 11 illustrates an example of a suitable computing system environment 100 on which an embodiment of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed-computing environments that include any of the above systems or devices, and the like.

Embodiments of the invention may be described in the general context of computer-executable instructions, such as program modules, executed by a computer. Generally, program modules include routines, programs, objects, components, data structures, and the like that perform particular tasks or implement particular abstract data types. Embodiments of the invention may also be practiced in distributed-computing environments where tasks are performed by remote processing devices that are linked through a communications network. In a distributed-computing environment, program modules may be located in both local- and remote-computer storage media including memory storage devices.

The operating environment illustrated in FIG. 11 typically includes at least some form of computer readable media. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

With reference to FIG. 11, an exemplary system for implementing an embodiment of the invention includes a computing device, such as computing device 100. In its most basic configuration, computing device 100 typically includes at least one processing unit 103 and memory 104.

Depending on the exact configuration and type of computing device, memory 104 may be volatile (such as random-access memory (RAM)), non-volatile (such as read-only memory (ROM), flash memory, etc.) or some combination of the two. This most basic configuration is illustrated in FIG. 11 by dashed line 106.

Additionally, device 100 may have additional features/functionality. For example, device 100 may also include additional storage (removable and/or non-removable) including, but not limited to, magnetic or optical disks or tape. Such additional storage is illustrated in FIG. 11 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included.

An embodiment of the present invention pertains to interferometric fiber optic gyroscopes (IFOGs), and particularly to depolarized IFOGs using non-polarization-maintaining SM fiber in the sensing coil. More particularly, an embodiment of the present invention pertains to the reduction of bias instability originated from polarization errors. Embodiments include both analytical/computational and empirical methods of testing and designing such gyroscopes.

Figure 1:
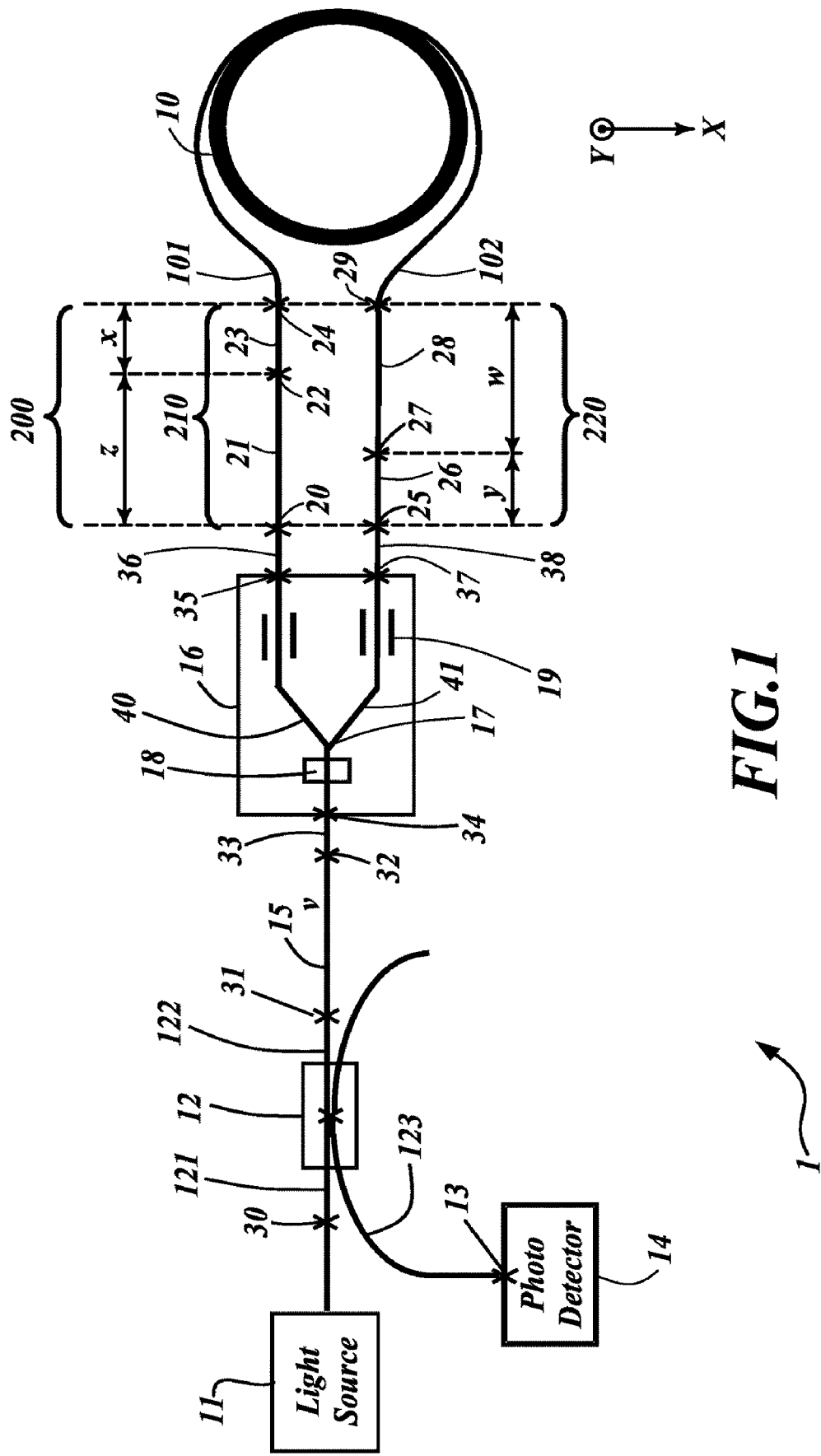
FIG. 1 illustrates an optical circuit of a depolarized gyroscope according to an embodiment of the invention.

The optical circuit 1 of a depolarized gyroscope is shown in FIG. 1. Depending on the embodiment, the circuit 1 may be computationally modeled using computer-executable instructions or may be a tangible device. A broadband light source 11 generates a lightwave $E_0$ that is composed of many waves with different wavelengths and polarization states at the splice 30. In the general case, the light emitted by broadband light source 11 may be described as a summation of many optical waves, i.e. $E_0 = \Sigma E_0(\lambda, |p\rangle)$, where $\lambda$ is wavelength (the spectrum of which ranges from $\lambda_1$ to $\lambda_1$) and $|p\rangle$ is a vector on the Poincaré sphere representing a particular polarization state. The phases of these waves with different wavelengths and polarization states may be uncorrelated. For a perfect unpolarized light source, the light intensity associated with all orthogonal polarization states will be identical. When the unpolarized light passes through an optical component with polarization-dependent loss (PDL), the lightwaves of orthogonal polarization states experience different losses and acquire different intensity at the output of the component.

A strict theoretical description of a broadband light source may require taking into account all the wavelength components and polarization states. However, for simplicity of the following discussion and without loss of generality, it may be assumed that the light source only contains two orthogonal polarization states for each wavelength component arriving at splice 30 in FIG. 1. The electric field of the broadband light source 11 can thus be expressed by a Jones vector $$E_0(\lambda) = \begin{pmatrix} E_{0x}(\lambda) \\ E_{0y}(\lambda) \end{pmatrix} = E_{0x}(\lambda) \begin{pmatrix} 1 \\ t_{11y}(\lambda) \end{pmatrix}. \tag{1}$$

Here we may assume the PDL experienced by the light source before point 30 is along the Y axis (i.e., the polarization state that experiences more loss is along the axis orthogonal to the plane of paper in FIG. 1). The amplitude transmission coefficient $t_{11y}(\lambda)$ quantifies the degree of polarization or PDL of light emitted by the light source 11 when arriving at splice 30.

The light fields reaching the photodetector 14 can be modeled using a Jones-matrix description of the gyro optical circuit 1. Element 12 can be any kind of directional coupler. Here, a 2×2 coupler is used as an example, which may include polarization maintaining (PM) fiber leads. There is normally a rotation angle α between the input light PDL axis and the PM fiber pass axis. The Jones matrix of such an angle rotation at splice 30 can be expressed as $$R_{30} = \begin{pmatrix} \cos\alpha & \sin\alpha \\ -\sin\alpha & \cos\alpha \end{pmatrix}. \tag{2}$$

If light emitted by the light source 11 experiences wavelength dependent PDL, the rotation angle α(λ) may be a function of wavelength λ. For simplicity, we implicitly assume the wavelength dependence of every parameter and omit the λ in the following expressions.

The propagation of light through the directional coupler 12, including its fiber leads, can be described by a Jones matrix $H_{in}$. This matrix takes into account the polarization dependent splitting ratio, PDL, cross-couplings and phase delays incurred by the coupler 12 as light propagates from splice 30 to splice 31.

Element 15 may be a piece of PM fiber that connects the coupler 12 and an integrated optical circuit (IOC) 16. Element 15 has a Jones matrix of $$D_{15} = \begin{pmatrix} 1 & 0 \\ 0 & e^{-id_{15}} \end{pmatrix}, \tag{3}$$

where $d_{15}$ is the relative phase delay of the slow axis with respect to the fast axis of the PM fiber 15. The IOC pigtails 33, 36 and 38 may be PM fibers. They can similarly be described by delay matrices $$D_j = \begin{pmatrix} 1 & 0 \\ 0 & e^{-id_j} \end{pmatrix}, \quad j = 33, 36, 38. \tag{4}$$

The splices, 31 and 32, between PM fibers, and the connection points, 34, 35 and 37, between IOC pigtail fibers and the IOC waveguides, are not perfect. They introduce small polarization cross-couplings, which can be described by Jones matrices $$K_j = \begin{pmatrix} 1 & k_j \\ -k_j & 1 \end{pmatrix}, \quad j = 31, 32, 34, 35, 37. \tag{5}$$

For light propagation from splice 30 to splice 34, the total Jones matrix G is $$G = \begin{pmatrix} G_{11} & G_{12} \\ G_{21} & G_{22} \end{pmatrix} = K_{34}D_{33}K_{32}D_{15}K_{31}H_{in}R_{30}. \tag{6}$$

The electric field at the input point 34 of the IOC waveguide is therefore $$\begin{pmatrix} A_x \\ A_y \end{pmatrix} = G\begin{pmatrix} E_{0x} \\ E_{0y} \end{pmatrix} = \begin{pmatrix} G_{11}E_{0x} + G_{12}E_{0y} \\ G_{21}E_{0x} + G_{22}E_{0y} \end{pmatrix} \tag{7}$$

Next, a Jones matrix $$\begin{pmatrix} M & N \\ L & J \end{pmatrix}$$

is used to represent the transmission of light through the sensing loop 10 in the clockwise direction, without taking into account the IOC phase modulation and its polarization extinction ratio ε. For the depolarized gyroscope shown in FIG. 1, the clockwise transmission matrix is $$\begin{pmatrix} M & N \\ L & J \end{pmatrix} = \tag{8}$$

$$D_{41}K_{37}D_{38}K_{25}D_{26}R_{27}D_{28}R_{29}C_{10}R_{24}D_{23}R_{22}D_{21}K_{20}D_{36}K_{35}D_{40}.$$

Here, $D_{40}$ and $D_{41}$ are delay matrices for the IOC waveguide 40 and 41. Delay matrices $D_{21}$, $D_{23}$, $D_{26}$, $D_{28}$ are for segments of PM fibers that constitute the depolarizer 200, which contains an upper section 210 and a lower section 220. The imperfect splices 20 and 25 with small angle misalignments are represented by matrices $K_{20}$ and $K_{25}$. The two 45° angle splices 22 and 27 between the two pair of depolarizer PM fiber segments 21, 23 and 26, 28 are represented by matrices $R_{22}$ and $R_{27}$. Once can also include rotation matrices $R_{24}$ and $R_{29}$ for the splices 24 and 29 between the depolarizer sections 210, 220 and the fiber leads 101, 102 of the single-mode sensing coil 10.

The Jones matrix for propagation of light in the counter-clockwise direction is the transpose of the clockwise counterpart, i.e.

$$\begin{pmatrix} M & L \\ N & J \end{pmatrix}.$$

Again, the IOC phase modulation and polarization property are not taken into account in this matrix.

The integrated optical circuit (IOC) 16 may be composed of a polarizing element 18 (alternatively, the polarizing element itself could be a waveguide), a beam splitter/combiner 17 and two or more electrodes 19 for phase-modulation of the light beams passing through the IOC waveguides 40 and 41. This phase modulation function of IOC is used for gyro bias modulation, which typically changes the phase of light polarized along the pass axis (the horizontal x-axis is assumed here) with a period equal to loop transit time $\tau$. If a clockwise propagating lightwave experiences a modulation phase $\phi_U(t)$ at the upper waveguide, it experiences a different modulation phase $\phi_U(t+\tau)$ at the lower waveguide. During the same time, the counter-clockwise wave can experience a modulation phase of $\phi_L(t)$ at the lower waveguide and $\phi_L(t+\tau)$ at the upper waveguide. For the situation of push-pull square-wave modulation, one can simply assume $\phi_U(t)=\phi_L(t+\tau)=\phi_B$ and $\phi_L(t)=\phi_U(t+\tau)=-\phi_B$ without loss of generality. In this case, the matrix that takes into account the IOC bias modulation and polarization extinction ratio for clockwise light propagation is $$\begin{pmatrix} e^{i\phi_B} & 0 \\ 0 & \varepsilon \end{pmatrix} \begin{pmatrix} M & N \\ L & J \end{pmatrix} \begin{pmatrix} e^{i\phi_B} & 0 \\ 0 & \varepsilon \end{pmatrix}, \quad (9)$$

and that for the counter clockwise propagation is $$\begin{pmatrix} e^{i\phi_B} & 0 \\ 0 & \varepsilon \end{pmatrix} \begin{pmatrix} M & L \\ N & J \end{pmatrix} \begin{pmatrix} e^{i\phi_B} & 0 \\ 0 & \varepsilon \end{pmatrix}. \quad (10)$$

The combined electric fields of CW and CCW light at IOC output 34 are therefore determined by the following equation:

$$\begin{pmatrix} B_x \\ B_y \end{pmatrix} = \begin{pmatrix} e^{i\phi_B} & 0 \\ 0 & \varepsilon \end{pmatrix} \begin{pmatrix} M & N \\ L & J \end{pmatrix} \begin{pmatrix} e^{i\phi_B} & 0 \\ 0 & \varepsilon \end{pmatrix} \begin{pmatrix} A_x \\ A_y \end{pmatrix} + \quad (11)$$
$$\begin{pmatrix} e^{i\phi_B} & 0 \\ 0 & \varepsilon \end{pmatrix} \begin{pmatrix} M & L \\ N & J \end{pmatrix} \begin{pmatrix} e^{i\phi_B} & 0 \\ 0 & \varepsilon \end{pmatrix} \begin{pmatrix} A_x \\ A_y \end{pmatrix}$$

Taking into account the Sagnac phase $2\phi_R$ induced by the rotation sensing and expanding the above equation, yields:

$$B_x = A_x(e^{i\phi_R+i2\phi_B} + e^{-i\phi_R-i2\phi_B})M + \varepsilon A_y(e^{i\phi_R+i\phi_B}N + e^{-i\phi_R-i\phi_B}L) \quad (12)$$

$$B_y = \varepsilon A_x(e^{i\phi_R+i\phi_B}L + e^{-i\phi_R-i\phi_B}N) + \varepsilon^2 A_y(e^{i\phi_R} + e^{-i\phi_R})J. \quad (13)$$

To obtain the electric field at the photodetector 14, matrix F is used to describe the optic path from point 34 to the photodetector 14. It is:

$$F = \begin{pmatrix} F_{11} & F_{12} \\ F_{21} & F_{22} \end{pmatrix} = T_{14} R_{13} H_{out} K_{31}^T D_{15} K_{32}^T D_{33} K_{34}^T. \quad (14)$$

Here $K_{32}^T$, $K_{33}^T$, $K_{34}^T$ are the transposes of matrices $K_{32}$, $K_{33}$, $K_{34}$ respectively $H_{out}$ is the coupler matrix for light transmission from splice 31 to photodetector 14. Matrix $$R_{13} = \begin{pmatrix} \cos\sigma & -\sin\sigma \\ \sin\sigma & \cos\sigma \end{pmatrix} \quad (15)$$

takes into account the mismatch angle of the PM fiber axis with respect to the axis of photodetector polarization-dependent responsivity, which is accounted for by matrix $$T_{14} = \begin{pmatrix} 1 \\ & t_{14_y} \end{pmatrix}. \quad (16)$$

With the matrix F, the electric field at the photodetector 14 can be expressed as $$\begin{pmatrix} E_x \\ E_y \end{pmatrix} = F\begin{pmatrix} B_x \\ B_y \end{pmatrix} = \begin{pmatrix} F_{11}B_x + F_{12}B_y \\ F_{21}B_x + F_{22}B_y \end{pmatrix} \quad (17)$$

The power of the horizontally polarized light at the photodetector 14 is $$I_x = E_x E_x^* = (F_{11}B_x + F_{12}B_y)(F_{11}B_x + F_{12}B_y)^* = \quad (18)$$
$$|F_{11}|^2 B_x B_x^* + |F_{12}|^2 B_y B_y^* + F_{11}F_{12}^* B_x B_y^* + F_{12}F_{11}^* B_y B_x^*$$

Substituting (12) and (13) into (18) yields:

$$I_x(\phi_B) = \quad (19)$$

$$|F_{11}|^2 \begin{bmatrix} 2|A_x M|^2(1+\cos(2\phi_R+4\phi_B)) + \\ 2\varepsilon|A_x A_y^*| \begin{pmatrix} |MN^*|(\cos(\phi_{M-N}+\phi_{Ax-Ay}+\phi_B) + \\ \cos(\phi_{M-N}+\phi_{Ax-Ay}-2\phi_R-3\phi_B)) + \\ |ML^*|(\cos(\phi_{M-L}+\phi_{Ax-Ay}-\phi_B) + \\ \cos(\phi_{M-L}+\phi_{Ax-Ay}+2\phi_R-3\phi_B)) \end{pmatrix} + \\ \varepsilon^2|A_y|^2(|N|^2+|L|^2+2|NL^*|\cos(\phi_{N-L}+2\phi_R+2\phi_B)) \end{bmatrix} +$$

$$|F_{12}|^2 \begin{bmatrix} \varepsilon^2|A_x|^2(|N|^2+|L|^2+2|NL^*|\cos(\phi_{N-L}-2\phi_R-2\phi_B)) + \\ 2\varepsilon^3|A_x A_y^*| \begin{pmatrix} (\cos(\phi_{L-J}+\phi_{Ax-Ay}+\phi_B) + \\ \cos(\phi_{L-J}+\phi_{Ax-Ay}+2\phi_R+\phi_B))|LJ^*| + \\ (\cos(\phi_{N-J}+\phi_{Ax-Ay}-\phi_B) + \\ \cos(\phi_{N-J}+\phi_{Ax-Ay}-2\phi_R-\phi_B))|NJ^*| \end{pmatrix} \end{bmatrix} +$$

$$|F_{11}F_{12}^*|$$

-continued $$\begin{bmatrix} 2\varepsilon|A_x|^2 \begin{pmatrix} |MN^*|(\cos(\phi_{F11-12}+\phi_{M-N}-\phi_B)+ \\ \cos(\phi_{F11-12}+\phi_{M-N}+2\phi_R-3\phi_B))+ \\ |ML^*|(\cos(\phi_{F11-12}+\phi_{M-L}+\phi_B) \\ +\cos(\phi_{F11-12}+\phi_{M-L}-2\phi_R-3\phi_B)) \end{pmatrix} + \\ 2\varepsilon^2|A_yA_x^*| \begin{pmatrix} |N|^2\cos(\phi_{F11-12}+\phi_{Ax-Ay}-2\phi_R)+ \\ |L|^2\cos(\phi_{F11-12}+\phi_{Ax-Ay}+2\phi_R+2\phi_B)+ \\ |NL^*|(\cos(\phi_{F11-12}+\phi_{Ax-Ay}-\phi_{N-L})+ \\ \cos(\phi_{F11-12}+\phi_{Ax-Ay}+\phi_{N-L})) \end{pmatrix} + \\ 2\varepsilon^2|A_xA_y^*||MJ^*| \begin{pmatrix} \cos(\phi_{F11-12}+\phi_{M-J}+\phi_{Ax-Ay}+2\phi_B)+ \\ \cos(\phi_{F11-12}+\phi_{M-J}+\phi_{Ax-Ay}-2\phi_B)+ \\ \cos(\phi_{F11-12}+\phi_{M-J}+\phi_{Ax-Ay}+2\phi_R+2\phi_B)+ \\ \cos(\phi_{F11-12}+\phi_{M-J}+\phi_{Ax-Ay}-2\phi_R-2\phi_B) \end{pmatrix} + \\ 2\varepsilon^3|A_y|^2 \begin{pmatrix} |NJ^*|(\cos(\phi_{F11-12}+\phi_{N-J}+\phi_B)+ \\ \cos(\phi_{F11-12}+\phi_{N-J}+2\phi_R+\phi_B))+ \\ |LJ^*|(\cos(\phi_{F11-12}+\phi_{L-J}-\phi_B)+ \\ \cos(\phi_{F11-12}+\phi_{L-J}-2\phi_R-\phi_B)) \end{pmatrix} \end{bmatrix}$$

In equation 19, $\phi_{M-N}$, $\phi_{M-L}$, $\phi_{N-L}$, $\phi_{L-J}$ and $\phi_{Ax-Ay}$ express the phase differences of the complex numbers M and N; M and L; N and L; L and J; $A_x$ and $A_y$. Similarly, term $\phi_{F11-12}$ represents the phase differences of complex numbers $F_{11}$ and $F_{12}$.

Demodulation of the above push-pull square-wave bias modulated signal is accomplished by calculating the differences of the light intensity in the neighboring time slots of loop transit time τ. Since the $\phi_B$ flips the sign in the neighboring period, τ, the demodulated signal is calculated by $$I_{x\_dm} = I_x(-\phi_B) - I_x(\phi_B) \qquad (20)$$

For the primary signal (i.e., the first term in Eq. (19)), the demodulated signal is $$I_{main\_x\_dm} = \qquad (21)$$
$$2|F_{11}|^2|A_xM|^2(\cos(2\phi_R-4\phi_B)-\cos(2\phi_R+4\phi_B)) =$$
$$4|F_{11}|^2|A_xM|^2\sin(2\phi_R)\sin(4\phi_B)$$

Demodulation of other terms in (19) yields two major types of polarization errors. One type is called amplitude type error, which is proportional to IOC polarization extinction ratio $\epsilon$. The other type is called intensity type error, which is proportional to $\epsilon^2$. Higher order terms are extremely small, and therefore are neglected for purposes of simplicity in the following discussion. Performing demodulation calculation similar to those in Equations (20) and (21), the amplitude-type polarization error light intensity along the x-axis is:

$$I_{amp\_x\_dm} = \qquad (22)$$
$$4\varepsilon|F_{11}|^2|A_xA_y^*|\begin{pmatrix} |MN^*|\begin{pmatrix} \sin(\phi_{M-N}+\phi_{Ax-Ay})\sin(\phi_B) \\ -\sin(\phi_{M-N}+\phi_{Ax-Ay}-2\phi_R)\sin(3\phi_B) \end{pmatrix} + \\ |ML^*|\begin{pmatrix} -\sin(\phi_{M-L}+\phi_{Ax-Ay})\sin(\phi_B) \\ +\sin(\phi_{M-L}+\phi_{Ax-Ay}+2\phi_R)\sin(3\phi_B) \end{pmatrix} \end{pmatrix} +$$

-continued $$4\varepsilon|F_{11}F_{12}^*||A_x|^2\begin{pmatrix} |MN^*|\begin{pmatrix} -\sin(\phi_{F11-12}+\phi_{M-N})\sin(\phi_B) \\ +\sin(\phi_{F11-12}+\phi_{M-N}+2\phi_R)\sin(3\phi_B) \end{pmatrix} + \\ |ML^*|\begin{pmatrix} \sin(\phi_{F11-12}+\phi_{M-L})\sin(\phi_B) \\ -\sin(\phi_{F11-12}+\phi_{M-L}-2\phi_R)\sin(3\phi_B) \end{pmatrix} \end{pmatrix}.$$

The intensity-type polarization error light intensity along the x-axis is $$I_{int\_x\_dm} = 4\varepsilon^2|F_{11}|^2|A_y|^2|NL^*|\sin(\phi_{N-L}+2\phi_R)\sin(2\phi_B) - \qquad (23)$$
$$4\varepsilon^2|F_{12}|^2|A_x|^2|NL^*|\sin(\phi_{N-L}-2\phi_R)\sin(2\phi_B) +$$
$$4\varepsilon^2|F_{11}F_{12}^*||A_yA_x^*|\begin{pmatrix} -|N|^2\sin(\phi_{F11-12}+\phi_{Ax-Ay}-2\phi_R)\sin(2\phi_B) \\ +|L|^2\sin(\phi_{F11-12}+\phi_{Ax-Ay}-2\phi_R)\sin(2\phi_B) \end{pmatrix} +$$
$$8\varepsilon^2|F_{11}F_{12}^*||A_xA_y^*||MJ^*|\sin(2\phi_R)\cos(\phi_{F11-12}+\phi_{M-J}+\phi_{Ax-Ay})\sin(2\phi_B).$$

In a similar manner, we can obtain the demodulated main signal along the y-axis $$I_{main\_y\_dm} = 4|F_{21}|^2|A_xM|^2\sin(2\phi_R)\sin(4\phi_B). \qquad (24)$$

The amplitude-type polarization error intensity along the y-axis is $$I_{amp\_y\_dm} = \qquad (25)$$
$$4\varepsilon|F_{21}|^2|A_xA_y^*|\begin{pmatrix} |MN^*|\begin{pmatrix} \sin(\phi_{M-N}+\phi_{Ax-Ay})\sin(\phi_B) \\ -\sin(\phi_{M-N}+\phi_{Ax-Ay}-2\phi_R)\sin(3\phi_B) \end{pmatrix} + \\ |ML^*|\begin{pmatrix} -\sin(\phi_{M-L}+\phi_{Ax-Ay})\sin(\phi_B) \\ +\sin(\phi_{M-L}+\phi_{Ax-Ay}+2\phi_R)\sin(3\phi_B) \end{pmatrix} \end{pmatrix} +$$
$$4\varepsilon|F_{21}F_{22}^*||A_x|^2\begin{pmatrix} |MN^*|\begin{pmatrix} -\sin(\phi_{F21-22}+\phi_{M-N})\sin(\phi_B) \\ +\sin(\phi_{F21-22}+\phi_{M-N}+2\phi_R)\sin(3\phi_B) \end{pmatrix} + \\ |ML^*|\begin{pmatrix} \sin(\phi_{F21-22}+\phi_{M-L})\sin(\phi_B) \\ -\sin(\phi_{F21-22}+\phi_{M-L}-2\phi_R)\sin(3\phi_B) \end{pmatrix} \end{pmatrix}$$

The intensity-type polarization error along the y-axis is $$I_{int\_y\_dm} = 4\varepsilon^2|F_{21}|^2|A_y|^2|NL^*|\sin(\phi_{N-L}+2\phi_R)\sin(2\phi_B) - \qquad (26)$$
$$4\varepsilon^2|F_{22}|^2|A_x|^2|NL^*|\sin(\phi_{N-L}-2\phi_R)\sin(2\phi_B) +$$
$$4\varepsilon^2|F_{21}F_{22}^*||A_yA_x^*|\begin{pmatrix} -|N|^2\sin(\phi_{F21-22}+\phi_{Ax-Ay}-2\phi_R)\sin(2\phi_B) \\ +|L|^2\sin(\phi_{F21-22}+\phi_{Ax-Ay}+2\phi_R)\sin(2\phi_B) \end{pmatrix} +$$
$$8\varepsilon^2|F_{21}F_{22}^*||A_xA_y^*||MJ^*|\sin(2\phi_R)\cos(\phi_{F21-22}+\phi_{M-J}+\phi_{Ax-Ay})\sin(2\phi_B)$$

The electric fields, $A_x$ and $A_y$, in expressions from (21) to (26) can be replaced by the incoming broadband light source fields, $E_{0x}$ and $E_{0y}$. After applying Eq. (7), the intensity $|A_x|^2$, $|A_y|^2$ and $A_xA_y^*$ can be expanded into the following form:

$$|A_x|^2 = (G_{11}E_{0x} + G_{12}E_{0y})(G_{11}E_{0x} + G_{12}E_{0y})^* = \\ |G_{11}|^2|E_{0x}|^2 + |G_{12}|^2|E_{0y}|^2 \quad (27)$$

$$|A_y|^2 = (G_{21}E_{0x} + G_{22}E_{0y})(G_{21}E_{0x} + G_{22}E_{0y})^* = \\ |G_{21}|^2|E_{0x}|^2 + |G_{22}|^2|E_{0y}|^2 \quad (28)$$

In the above equations, the terms that have phase difference of $E_{0x}$ and $E_{0y}$ components can be ignored because they are uncorrelated and average to zero over time.

Summing the intensities along both x- and y-axes, and using equations, $E_{0x}(\lambda)=\sqrt{S(\lambda)}$, $E_{0y}(\lambda)=t_{11y}\sqrt{S(\lambda)}$ implied in Eq. (1) for light with intensity $S(\lambda)$ at wavelength $\lambda$, the main signal light intensity becomes $$I_{main\_dm}(\lambda) = \\ 4S(\lambda)(|F_{11}|^2 + |F_{21}|^2)(|G_{11}|^2 + |G_{12}|^2|t_{11y}|^2)|M|^2\sin(2\phi_R)\sin(4\phi_B). \quad (30)$$

The total main signal intensity is obtained through wavelength integration over the entire light source spectrum. From (30), the scale factor to convert light intensity to rate in unit of deg/hr is obtained, $$SF = \frac{1}{4\int_{\lambda_1}^{\lambda_2} S(\lambda)(|F_{11}|^2 + |F_{21}|^2)(|G_{11}|^2 + |G_{12}|^2|t_{11y}|^2)|M|^2\sin(4\phi_B)\,d\lambda} \cdot \\ \frac{\bar{\lambda}c}{2\pi L_{coil}D_{coil}} \cdot \frac{180}{\pi} \cdot 3600. \quad (31)$$

where $L_{coil}$ and $D_{coil}$ are the sensing coil 10 fiber length and average coil diameter, and $\bar{\lambda}$ is the light source mean wavelength. The scale factor is used to convert spurious light intensities to bias error with unit of deg/hr.

The total amplitude type error, taking into account both x- and y-axes, is $$I_{amp\_dm}(\lambda) = \quad (32) \\
4\varepsilon S(\lambda)(|F_{11}|^2 + |F_{21}|^2)|G_{11}G_{21}^*|(|MN^*|\sin(\phi_{M-N} + \phi_{G11-21}) - \\
|ML^*|\sin(\phi_{M-L} + \phi_{G11-21}))(\sin(\phi_B) - \sin(3\phi_B)) + \\
4\varepsilon S(\lambda)(|F_{11}|^2 + |F_{21}|^2)|G_{12}G_{22}^*||t_{11y}|^2(|MN^*|\sin(\phi_{M-N} + \\
\phi_{G12-22}) - |ML^*|\sin(\phi_{M-L} + \phi_{G12-22}))(\sin(\phi_B) - \\
\sin(3\phi_B)) - 4\varepsilon S(\lambda)|F_{11}F_{12}^*|(|G_{11}|^2 + \\
|G_{12}|^2|t_{11y}|^2)(|MN^*|\sin(\phi_{F11-12} + \phi_{M-N}) - \\
|ML^*|\sin(\phi_{F11-12} + \phi_{M-L}))(\sin(\phi_B) - \sin(3\phi_B)) - \\
4\varepsilon S(\lambda)|F_{21}F_{22}^*|(|G_{11}|^2 + \\
|G_{12}|^2|t_{11y}|^2)(|MN^*|\sin(\phi_{F21-22} + \phi_{M-N}) - \\
|ML^*|\sin(\phi_{F21-22} + \phi_{M-L}))(\sin(\phi_B) - \sin(3\phi_B))$$

The total intensity-type error is $$I_{int\_dm}(\lambda) = 4\varepsilon^2 S(\lambda)(|F_{11}|^2 + \quad (33) \\
|F_{21}|^2)(|G_{21}|^2 + |G_{22}|^2|t_{11y}|^2)|NL^*|\sin(\phi_{N-L})\sin(2\phi_B) - \\
4\varepsilon^2 S(\lambda)(|F_{12}|^2 + |F_{22}|^2)(|G_{11}|^2 + \\
|G_{12}|^2|t_{11y}|^2)|NL^*|\sin(\phi_{N-L})\sin(2\phi_B) - \\
4\varepsilon^2 S(\lambda)|F_{11}F_{12}^*||G_{11}G_{21}^*|(|N|^2 - |L|^2)\sin(\phi_{G11-21} + \\
\phi_{F11-21})\sin(2\phi_B) - 4\varepsilon^2 S(\lambda)|F_{11}F_{12}^*||G_{12}G_{22}^*||t_{11y}|^2(|N|^2 - \\
|L|^2)\sin(\phi_{G12-22} + \phi_{F11-21})\sin(2\phi_B) - \\
4\varepsilon^2 S(\lambda)|F_{21}F_{22}^*||G_{11}G_{21}^*|(|N|^2 - \\
|L|^2\sin(\phi_{G11-21} + \phi_{F21-22})\sin(2\phi_B) - \\
4\varepsilon^2 S(\lambda)|F_{21}F_{22}^*||G_{12}G_{22}^*||t_{11y}|^2(|N|^2 - \\
|L|^2)\sin(\phi_{G12-22} + \phi_{F21-22})\sin(2\phi_B)$$

The total error rate originated from both amplitude- and intensity-type polarization errors may thus be:

$$\text{Bias} = SF \cdot \int_{\lambda_1}^{\lambda_2} (I_{amp\_dm}(\lambda) + I_{int\_dm}(\lambda))\,d\lambda. \quad (34)$$

Integration over wavelength from $\lambda_1$ to $\lambda_2$ covers the broadband light source wavelength range. Data characterizing the total error rate and/or other error information may be displayed to output device 116.

Figure 2:
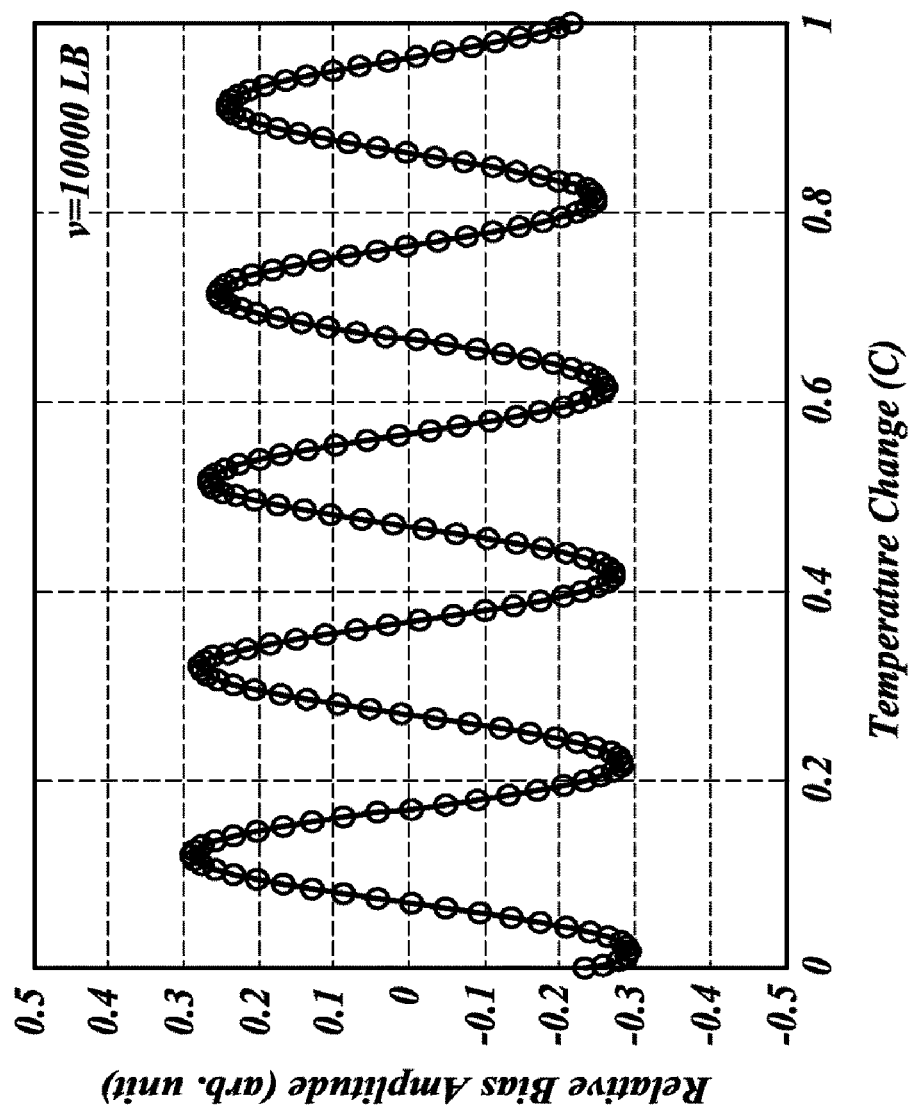
FIG. 2 illustrates an example of a bias versus temperature plot for a gyroscope with polarization errors obtained according to an embodiment of the invention.

The approach described above predicts a bias offset when there are polarization errors. Since the polarization errors are the result of interference of waves propagating along different respective optical paths, relative changes of optical paths will cause the corresponding polarization error to fluctuate. The said "optical path" depends on the polarization state of the light. For a PM fiber, there are two polarization modes. One mode is polarized along the so-called "slow polarization axis" in the fiber cross-section. It acquires more phase delays than the other polarization mode which is polarized along the orthogonal "fast polarization axis". The slow mode effectively travels along a longer optical path than the fast mode. To quantify the phase difference associated with the fast and slow modes in a PM fiber, it is advantageous to express the lengths of fiber in terms of "beat length" ($L_B$), such that $L_B=\lambda/\Delta n$, where $\lambda$ is the light wavelength, and $\Delta n$ is the difference in effective mode refractive index between the fast and the slow polarization modes. Typically, $L_B$ ranges from 1 mm to 4 mm. The phase difference between slow and fast light after propagating over fiber length of $L_B$ is $2\pi$. Typically, the fiber beat length $L_B$ increases slightly when temperature increases (i.e., the temperature is ramped). Changing the PM fiber temperature is equivalent to changing the phase difference of the slow and fast light waves, and is one of the effective ways to excite polarization error induced bias fluctuations. For example, if the PM fiber 15 is assumed to have a length of v=10000 $L_B$, and the beat length $L_B$ of the PM fiber has a temperature sensitivity of 500 ppm/° C., the relative phase change of the fast and slow light will undergo five cycles per ° C., i.e. $10\pi$/° C. FIG. 2 illustrates a plot of such relative bias versus temperature change for a gyroscope with polarization errors using an approach according to an embodiment of the invention. Since absolute bias depends on specific gyroscope design, only relative bias amplitude values in arbitrary linear unit are used throughout the document without lost of significances. To perform a real temperature ramp measurement, the gyro is put in a temperature chamber under constant rotation rate, e.g. the earth rotation rate. The temperature is gradually increased while rates are continuously read from the gyro. If the gyro under test has substantial polarization errors, the rates will exhibit sinusoidal oscillation patterns versus temperature. The temperature period of the oscillation is a good indicator of the phase delay involved in the polarization error. Measuring bias fluctuation under temperature ramping of selected sections of the optical circuit is an effective way to identify the cause of the polarization error and allow a testing user to replace or otherwise modify inferior portions in the circuit with more optimally configured portions. Additionally, based on the above-described analytical approach, an embodiment includes analytically simulating the bias fluctuations under temperature ramping. The temperature ramping test and methods according to embodiments of the invention are powerful tools in gyroscope polarization error investigations.

Figure 4:
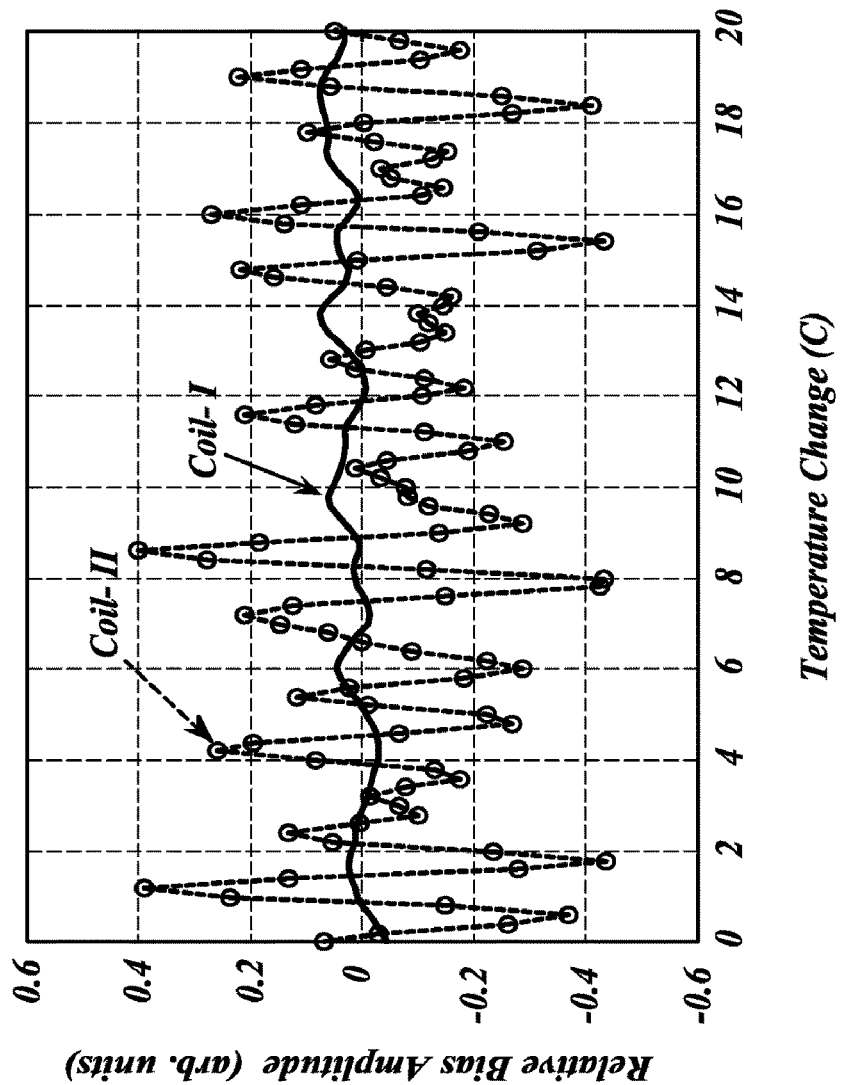
FIG. 4 illustrates a comparison of bias thermal instabilities under temperature ramping for two gyroscopes having identical optical components except for the coil (coil-I and II, respectively) according to an embodiment of the present invention.

In the calculation method developed above, the wavelength dependent Jones matrix of the single mode non-polarization-maintaining fiber coil is used. The matrix can actually be measured directly using a polarization-mode-dispersion (PMD) characterization instrument. The coil matrix can also be modeled by treating the coil as a concatenation of many random birefringent elements. With the availability of the coil Jones matrix, the coherence function and the wavelength dependent differential group delay (DGD) of the coil can be determined. FIG. 3a shows two coil coherence functions. Coil-I is represented by a solid line and coil-II is represented by a dashed line. These coil coherence functions, or autocorrelation functions, characterize interference fringe contrast as a function of delay length of broadband lightwaves passing through the coil. At delay length of 2 mm, coil-I exhibits much smaller fringe contrast (−30 dB) compared to coil-II (−18 dB). FIG. 3b shows the wavelength dependent DGDs and the averaged DGDs of the corresponding coil-I and coil-II. Coil-I has an average DGD value of 0.85 ps, much smaller than that of coil-II (dashed line, average DGD=1.81 ps). In other words, coil-I has smaller internal birefringence than coil-II. In the design of depolarized gyroscopes, fabricating coils with low birefringence is advantageous in lowering polarization errors. FIG. 4 shows a comparison of relative bias fluctuation amplitude under temperature ramping for two gyroscopes having identical design, except for their respective coils, coil-I and II. FIG. 4 illustrates that the gyroscope using coil-II (dashed lines with circle marks) exhibits significantly larger bias instability than that using coil-I (solid line).

The coupler 12 in the optical circuit also plays an important role in controlling polarization errors. As mentioned earlier, the Jones matrix of the coupler shall take into account the polarization dependent splitting ratio (PDSR) and PDL. For light propagating from point 30 to point 31, the x- and y-polarized light have different amplitude transmission coefficient $s_x$ and $s_y$. There are also cross-couplings between x- and y-polarized light that can be quantified by parameter $k_{12}$. After taking into account the phase delays, $d_{121}$, $d_{122}$ of the input and output pigtails 121 and 122 of the coupler, the Jones matrix of the coupler 12 can be written as $$H_{in} = \begin{pmatrix} 1 & 0 \\ 0 & e^{-id_{122}} \end{pmatrix}\begin{pmatrix} 1 & k_{12} \\ -k_{12} & 1 \end{pmatrix}\begin{pmatrix} s_x & 0 \\ 0 & s_y \end{pmatrix}\begin{pmatrix} 1 & 0 \\ 0 & e^{-id_{121}} \end{pmatrix} \approx \quad (35)$$

$$s_x\begin{pmatrix} 1 & k_{12}e^{-id_{121}} \\ -k_{12}e^{-id_{122}} & \left(\frac{s_y}{s_x}\right)e^{-i(d_{121}+d_{122})} \end{pmatrix} \approx$$

$$\begin{pmatrix} 1 & k_{12}e^{-id_{121}} \\ -k_{12}e^{-id_{122}} & e^{-i(d_{121}+d_{122})}\sqrt{10^{L_{PDSR}/10}} \end{pmatrix}$$

Figure 5:
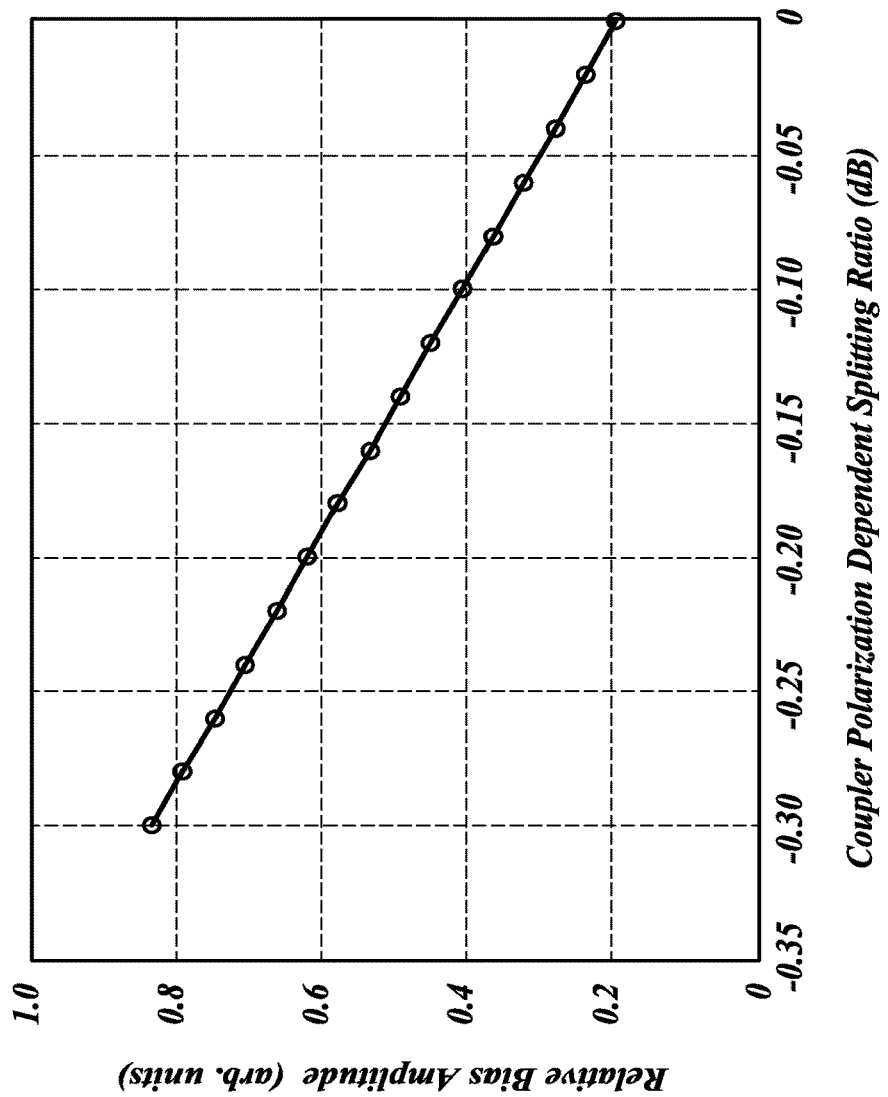
FIG. 5 illustrates an example of calculation of relative gyroscope bias fluctuation amplitude as a function of the 2×2 coupler polarization dependent splitting ratio (PDSR)

In the above equation $L_{PDSR}$ is the polarization splitting ratio difference in decibel units. Other PDL are omitted for simplification. Since the common loss and phase experienced by both x- and y-polarized light are not important in the final result of the polarization error calculation, the factor of $s_x$ in the expression of (35) may be omitted in the last step. Similarly, for propagation of light from point 31 to photodetector splice 13, the coupler matrix can be written as $$H_{out} = \begin{pmatrix} 1 & 0 \\ 0 & e^{-id_{123}} \end{pmatrix}\begin{pmatrix} r_x & 0 \\ 0 & r_y \end{pmatrix}\begin{pmatrix} 1 & -k_{12} \\ k_{12} & 1 \end{pmatrix}\begin{pmatrix} 1 & 0 \\ 0 & e^{-id_{122}} \end{pmatrix} \approx \quad (36)$$

$$\begin{pmatrix} \sqrt{10^{L_{PDSR}/10}} & -k_{12}e^{-id_{122}} \\ k_{12}e^{-id_{123}} & e^{-i(d_{122}+d_{123})} \end{pmatrix}$$

where $d_{123}$ is the phase delay caused by the coupler pigtail 123. Although small PDSR has been assumed in the approximations of expressions, it is not intended to limit the application of the method to use more general forms of $H_{in}$ and $H_{out}$ matrices. As illustrated in FIG. 5, the relative bias fluctuation amplitude under temperature ramping is found to decrease monotonically as PDSR approaches zero. It is therefore advantageous to use a coupler having small PDSR and PDL to reduce the bias instability.

Figure 6:
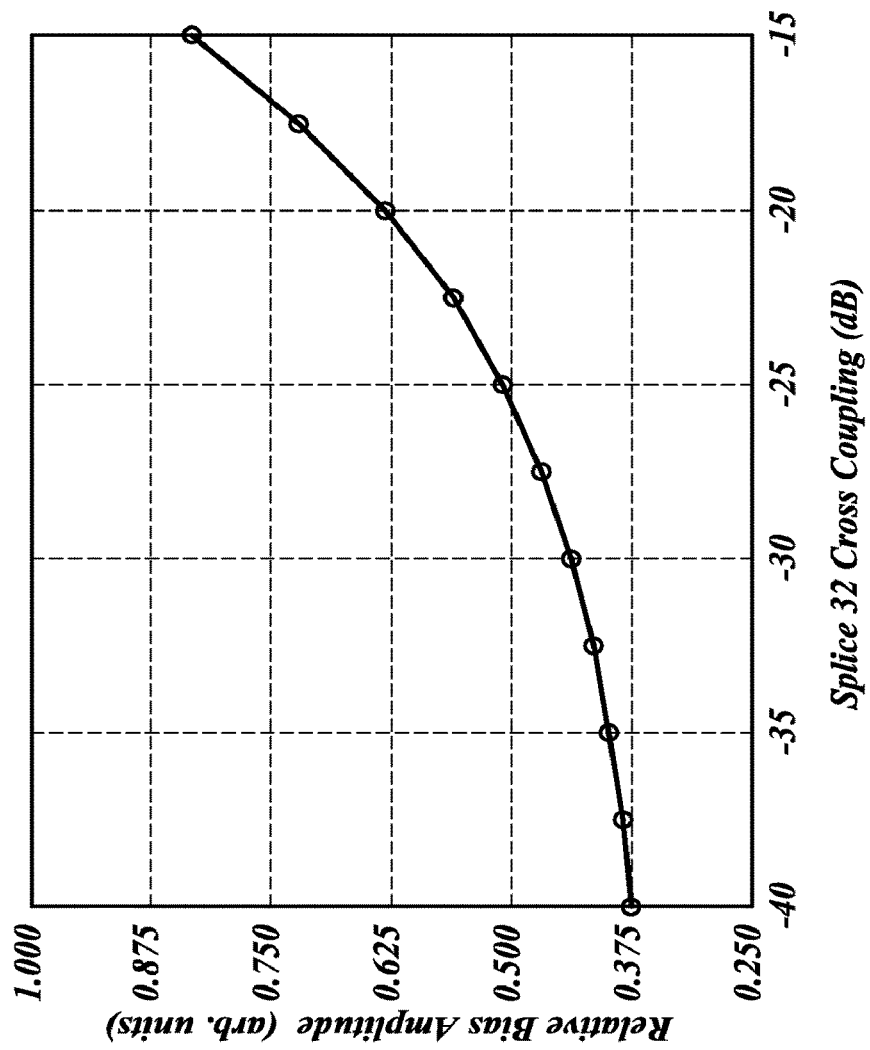
FIG. 6 illustrates an example of calculation of relative gyroscope bias fluctuation amplitude as a function of the cross-coupling at splice 32 of FIG. 1.

Most of the spurious light producing polarization errors originates from cross-couplings at fiber splices or in optical components. It is therefore advantageous to reduce these cross-couplings as much as possible. FIG. 6 shows a dependence of relative bias error as a function of the cross-coupling at splice 32 (i.e., $k_{32}$). It is obvious that smaller $k_{32}$ produces smaller bias. A method, according to an embodiment, to reduce cross-couplings at splices between two PM fibers is to use the identical or similar fiber types. The distortions involved at the joint points are reduced when the two connecting fibers have the same mode field diameter, stress elements and refraction index.

Figure 7:
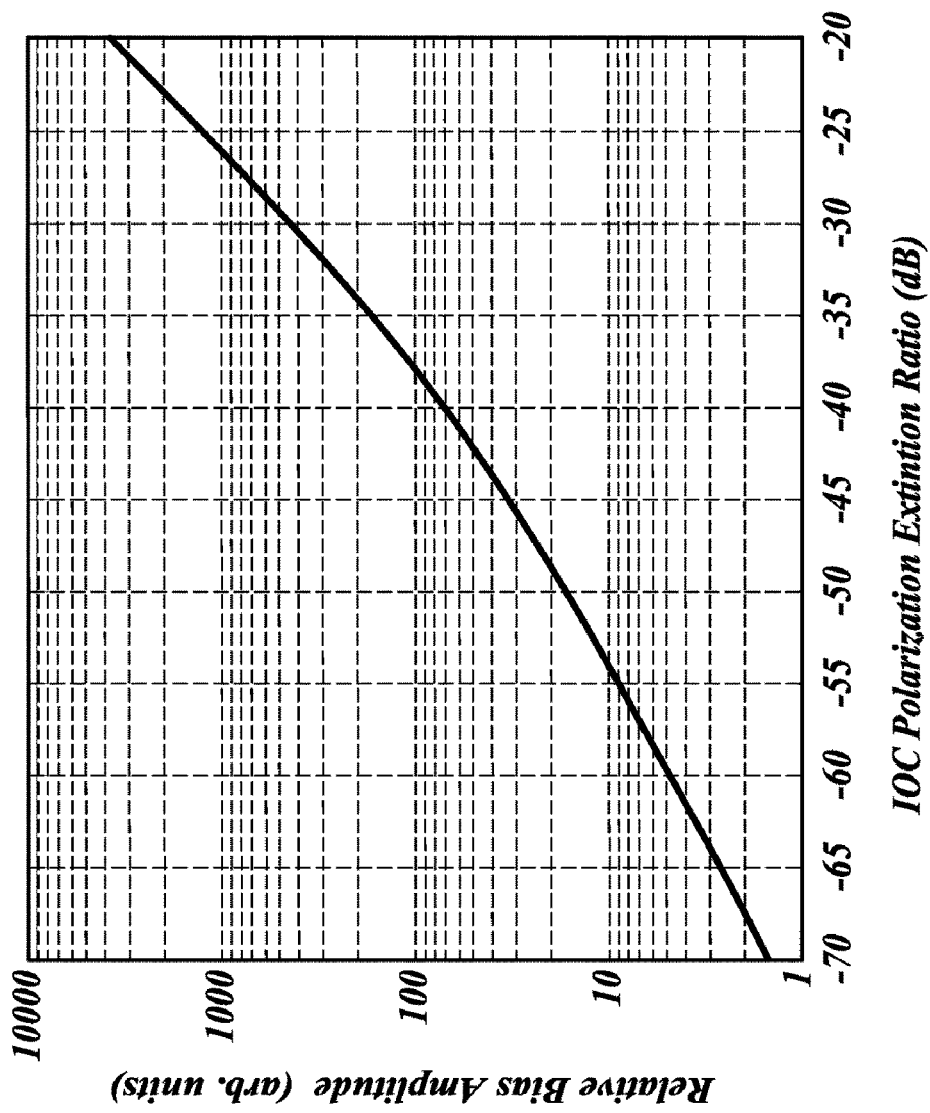
FIG. 7 illustrates an example of calculation of polarization error induced relative bias fluctuation amplitude as a function of IOC polarization extinction ratio.

In the calculation of polarization error, one can observe that the amplitude-type polarization error is proportional to the IOC polarization extinction ratio (PER), $\epsilon$, and the intensity type error is proportional to $\epsilon^2$. As an example, FIG. 7 shows a calculation for polarization error induced relative bias instabilities as a function of IOC PER. Indeed, by selecting IOC with smaller PER, bias fluctuation amplitude may be reduced.

Figure 8:
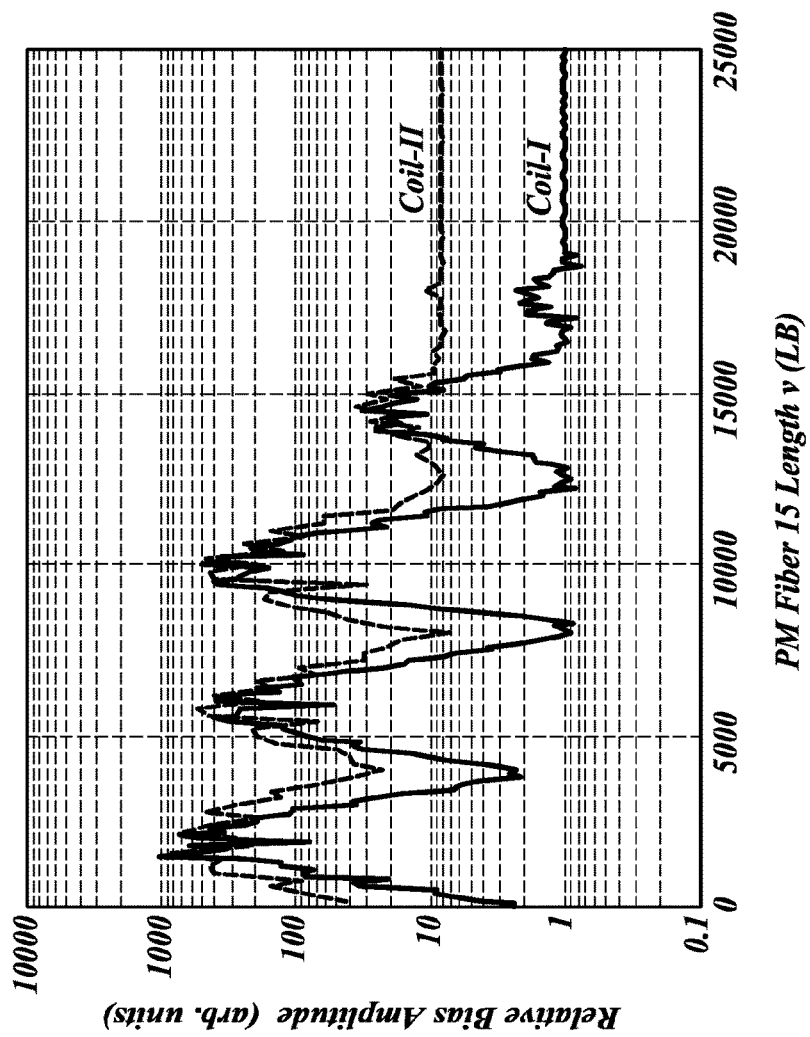
FIG. 8 illustrates dependence of relative bias fluctuation amplitude on the length v, of PM fiber 15 of FIG. 1 for a depolarizer design according to an embodiment.

Design of depolarizer 200 and the PM fiber 15 are effective ways to reduce gyro bias error according to an embodiment. As illustrated in the example of FIG. 1, the depolarizer 200 is composed of two sections, 210 and 220. Section 210 is composed of two pieces of PM fiber, 21 and 23, with polarization axis oriented about 45° with each other at splice 22. Section 220 is composed of two pieces of PM fiber, 26 and 28, with polarization axis oriented about 45° with each other at splice 27. Section 15 is a piece of PM fiber that generates delays for the slow and fast light before such light enters the IOC 16. The lengths of PM fibers 15, 21, 23, 26 and 28 are designated in FIG. 1 as, respectively, v, z, x, y and w. Together with IOC pigtail and waveguide lengths, 33, 36, 38, 40 and 41, determination of the lengths of PM fibers 15, 21, 23, 26 and 28 are important in the design of depolarized gyroscopes from the standpoint of controlling polarization error. These lengths determine the relative time delays involved in the broadband light source interference. Longer delays cause decrease of interference fringe contrast and less bias fluctuations under temperature changes. By tailoring the lengths of these PM fibers, it is possible to control the polarization error below a certain value. For example, FIG. 8 shows, in association with gyroscopes employing, respectively, coil-I and coil-II discussed above, a dependence of polarization error induced relative bias fluctuation amplitude on the length of PM fiber 15 in unit of beats for a design of depolarizer 200 according to an embodiment. Selecting length, v, far away from an error peaking region is an effective way to reduce polarization error induced bias instability.

In an embodiment, the length, w, is selected to be approximately twice that of length, x (i.e., w=2x). In addition, the physical lengths of the depolarizer section 210 and 220 are kept approximately the same (i.e., z=x+y). Sections 210, 220 may be winded onto the coil 10 with the symmetrical points, i.e. points with equal optical length measured from splitting point 17 in IOC, located close to each other to avoid the temperature-fluctuation-induced non-reciprocal phase noise (i.e., the so-called Shupe effect induced noise). To minimize the overall depolarizer length, the length, y, and IOC pigtail lengths, 33, 36 and 37 may be selected to be as short as possible. In such an embodiment of the model, the optimal lengths of x and v are determined once the IOC, coupler and coil properties are known.

Figure 9B:
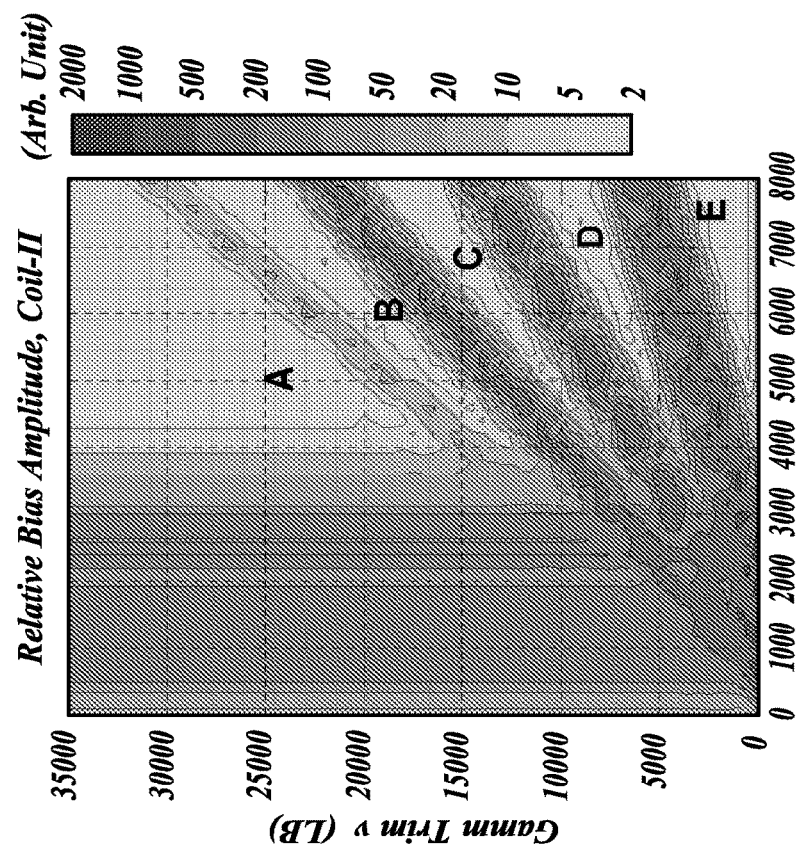
FIGS. 9a and 9b illustrate a first example of contour plots of relative bias fluctuation amplitude as a function of PM fiber lengths, x and v.
Figure 9A:
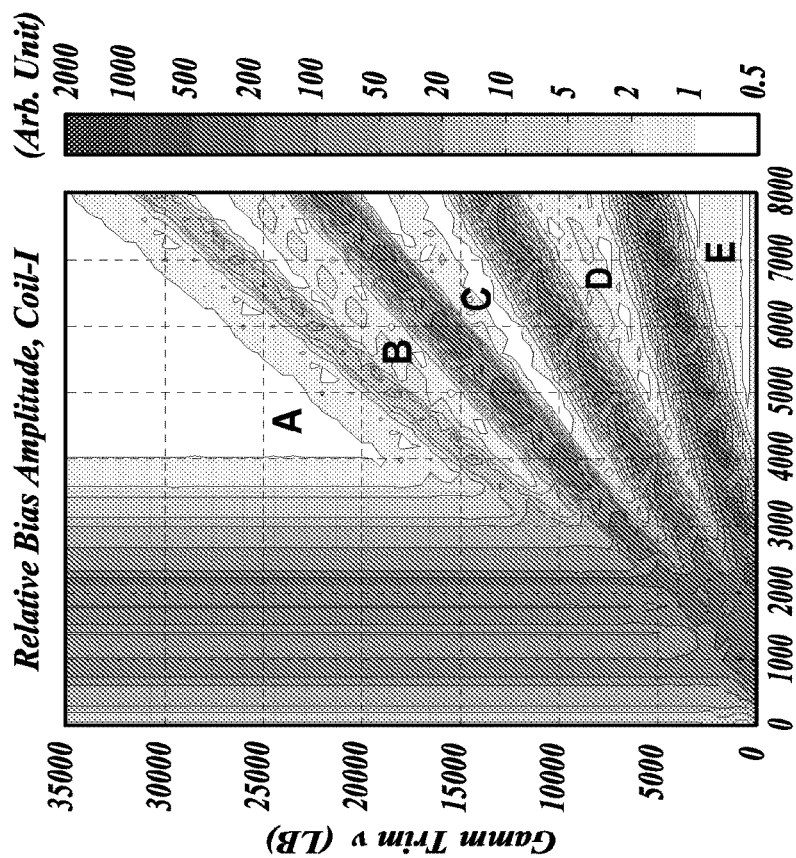

As an example of showing the method to optimize the depolarizer and PM fiber 15 design, the calculated relative bias fluctuation amplitude under temperature ramp is plotted as functions of x and v in the contour plots illustrated in FIG. 9a and FIG. 9b. FIG. 9a is plotted for a gyroscope using the coil-I associated with FIG. 3 that has relatively smaller birefringence. FIG. 9b is plotted for a gyroscope using the coil-II associated with FIG. 3 that has relatively larger birefringence. In both figures, dark regions have larger bias errors than those in the light regions. Same color codes are used for FIGS. 9a and 9b for comparison. Several v-x regions exhibit low bias errors and may thus be preferable. These regions are marked as A, B, C, D and E. They are located between five dark regions with large bias fluctuation amplitudes. From comparison of FIGS. 9a and 9b, it may be seen that the coil birefringence has significant impact on the gyroscope design. Larger coil birefringence causes minimization of the optimal-design regions and larger background bias errors in the relatively optimal design regions.

Still referring to FIGS. 9a and 9b, the four narrow dark regions, roughly along the southwest-northeast direction, are found to have v-x relations close to:

$$v = 4x + y - d_{32-27} \quad \text{ridge between } A \text{ and } B, \quad (37)$$
$$v = 3x - d_{32-27} \quad \text{ridge between } B \text{ and } C,$$
$$v = 2x - d_{32-27} \quad \text{ridge between } C \text{ and } D,$$
$$v = x - d_{32-27} \quad \text{ridge between } D \text{ and } E.$$

where $d_{32-27} = L_{IOC} + y + d_{33} + d_{38}$ is the relative phase delay of the fast and slow light of the optical path between 32 and 27, which includes the IOC waveguide 41, pigtails 33 and 38, and the depolarizer PM fiber 26. These regions of high bias instability are associated with amplitude type polarization errors originating from the interference of the IOC-passed (x-polarized) waves and the IOC-rejected (y-polarized) waves traveling through the sensing loop 10. A preferable choice of design is often situated in the region A because of its larger low error region providing greater margins against coil uncertainties. However, designs in region A may require longer lengths of depolarizer and PM fibers 15, which may be of concern for gyro packaging and control of Shupe effect. Regions B, C, D and E are therefore of interest in design choices for reducing the PM fiber lengths.

However, the depolarizer x length cannot be lowered below a certain value. The broader vertically oriented regions on the left sides of FIGS. 9a and 9b can undermine bias performance if the length x is too small. This region is associated with polarization errors insensitive to the PM fiber 15 length v. Such errors mostly originate from interference among waves passing through the PM fiber 15 in the same polarization axis. As depolarizer length x increases, this type of error decreases.

As another illustration of an embodiment of a depolarized gyroscope, one can optimize the lengths x and w as separate parameters, rather than observing the relation w=2x. In such an embodiment, the length y can be set to a fixed value, and w+y is set equal to the sum of x and z (i.e., z=y+w−x). As such, the depolarizer sections 210 and 220 have the same length. Next, the PM fiber 15 may be first set to a large value. As discussed elsewhere herein, it is known that v-insensitive error can be minimized by setting the length v, to a very large value. The design may now be reduced to the determination of the optimal lengths of x and w. Once optimal x and w is found to minimize the v insensitive polarization error, the PM fiber 15 length v can then be determined to reduce the v sensitive polarization errors. One will see below that w=2x used in an earlier-discussed embodiment is indeed one of the optimal selections of the w-x relationship for better bias stability.

Figures 10A, 10B:
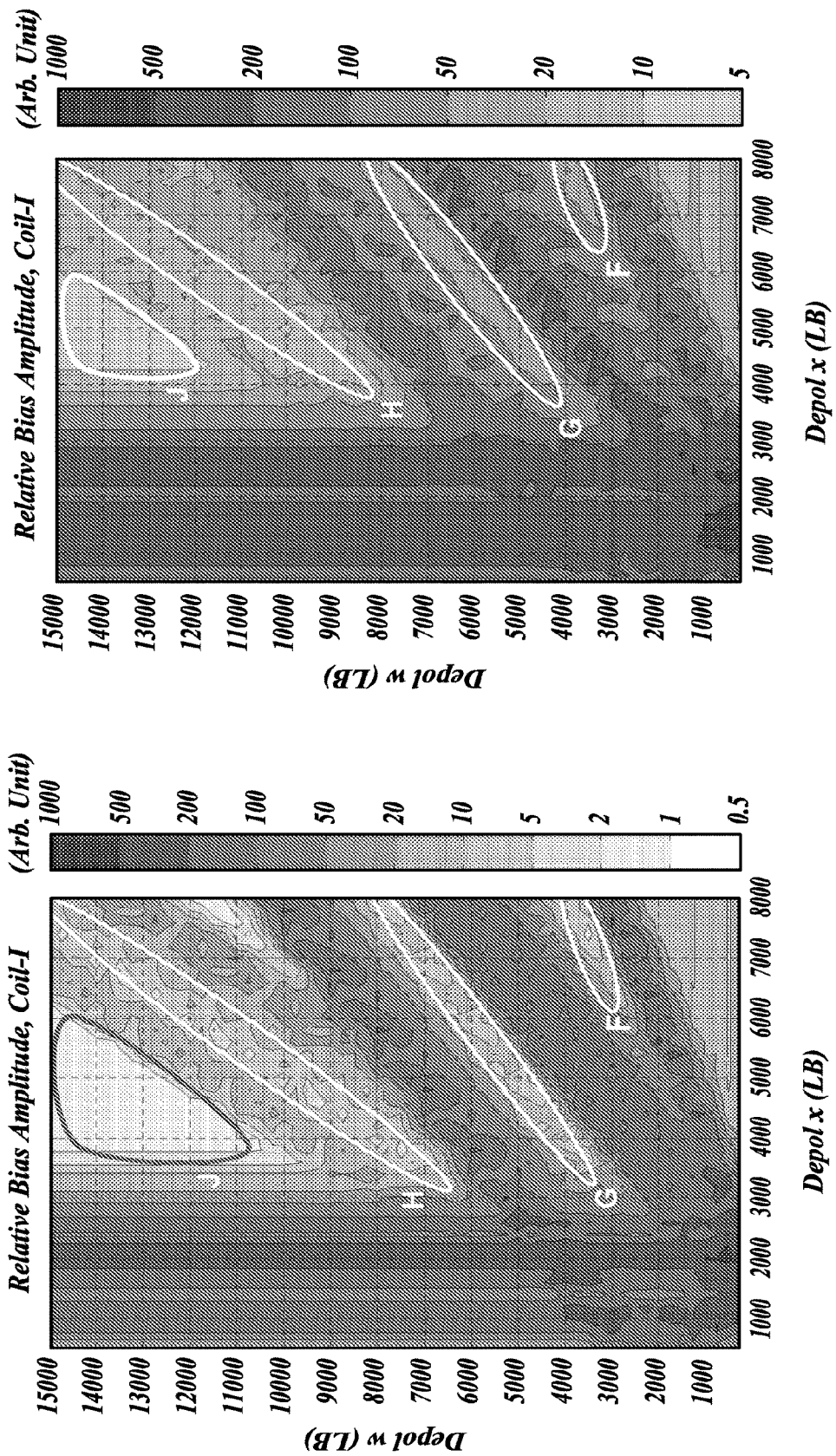
FIGS. 10a and 10b illustrate a second example of contour plots of relative bias fluctuation amplitude as a function of fiber lengths, x and w.

FIG. 10a and FIG. 10b illustrate plots of relative bias fluctuation amplitude calculation results as functions of x and w using coil-I and coil-II, respectively. There are multiple design regions providing low bias instability. Among them, regions F, G, H, and J are often of greater interest because they offer relatively shorter depolarizer fiber lengths. Region F has an approximate relationship between w and x of w=x/2 or x=2w. Region G has a relation of w=x, which means the two depolarizer PM fiber lengths are close to identical. Region H has a relation of w=2x, which was selected in an above-described embodiment and used in generating FIGS. 9a and 9b. Regions H and F are of the same type from the point of view of symmetry (i.e., one of the x or w lengths is twice of the other). Region J is a wider region and may have better bias stabilities than those of region F, G and H.

An embodiment includes using a temperature-ramping approach, for example, to select optimized values of depolarizer fiber section length w and x substantially in the regions of F, G, H and J shown in FIGS. 10a and b, to minimize v-insensitive polarization errors while setting v at a substantially long length. In one exemplary embodiment, w is substantially equal to 8000 $L_B$, x is substantially equal to 4000 $L_B$, y is substantially equal to 500 $L_B$, and z substantially equal to 4500 $L_B$. Additionally, the v may be substantially longer than 16500 $L_B$ (region-A in FIGS. 9a and 9b), substantially equal to 12500 $L_B$ (region-B in FIGS. 9a and 9b), equal to 8000 $L_B$ (region-C in FIGS. 9a and 9b), substantially equal to 4000 $L_B$ (region-D in FIGS. 9a and 9b), or substantially less than 1000 $L_B$ (region-E in FIGS. 9a and 9b).

The relative bias amplitude in these regions can be clearly seen by referring back to FIG. 8, which is a plot of bias versus PM fiber length, v, when the x=4000 $L_B$, y=500 $L_B$ and w=8000 $L_B$ are selected. Again, the solid line is associated with the coil-I and the dashed line associated with the coil-II. As is illustrated, the designs using larger v-value regions (A, B and C) around v>16500 $L_B$, v=12500 and 8000 $L_B$ have better tolerance to fiber length uncertainties than those using smaller v-values regions (D and E) around v=4000 $L_B$ and v<1000 $L_B$.

While preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A fiber optic gyroscope comprising:
a broadband light source having an output fiber end;
a directional coupler having a first optical fiber port, a second optical fiber port and a third optical fiber port, the first optical fiber port coupled to the light source output fiber end;
wherein light entering the first optical fiber port is directed to the second fiber optical port, and light entering the second optical fiber port is directed to the third optical fiber port;
a photodetector coupled to the third optical fiber port of the directional coupler;
a polarization maintaining (PM) delay management fiber of length v, having a first end and a second end, wherein the first end of the polarization maintaining delay management fiber is coupled to the second optical fiber port of the directional coupler;
an integrated optical circuit (IOC) having
an input end coupled to the second end of the polarization maintaining delay management fiber via a first polarization maintaining fiber pigtail of length $d_1$;
a first output end coupled to a second polarization maintaining fiber pigtail with length of $d_2$;
a second output end coupled to a third polarization maintaining fiber pigtail with length of $d_3$; and
a splitter that directs light coupled into the input end to the first output end and the second output end with substantially equal power;
wherein the integrated optic circuit (IOC) comprises a polarization maintaining waveguide device having waveguide length of $L_{IOC}$ and comprise a polarizing element so that the total effective polarization extinction ratio (PER) of the integrated optic circuit is $\epsilon$;
a single mode optical fiber loop having a first end and a second end; and
a depolarizer region coupled to said fiber loop, said depolarizer region including a first optical fiber section of length x, a second optical fiber section of length z, a third optical fiber section of length w and a fourth optical fiber section of length y, each comprising polarization maintaining fibers having a beat length of $L_B$;
wherein the second optical fiber section is coupled to the first optical fiber section via a first splice, the first optical fiber section is coupled to the first end of the single mode optical fiber loop via a second splice, the fourth optical fiber section is coupled to the third optical fiber section via a third splice, and the third optical fiber section is coupled to the second end of the single mode optical fiber loop via a fourth splice and wherein x+z is substantially equal to w+y;
wherein the lengths of v, x, y, $d_1$ and $d_3$ are proportioned to avoid regions of high bias instability defined by the expressions $v=x-(L_{IOC}+y+d_1+d_3)$, $v=2x-(L_{IOC}+y+d_1+d_3)$, $v=3x-(L_{IOC}+y+d_1+d_3)$, and $v=4x+y-(L_{IOC}+y+d_1+d_3)$.

2. The fiber optic gyroscope of claim 1, wherein
said first splice having an alignment substantially close to 45° between a major axis of polarization of said first fiber section and a major axis of polarization of said second fiber section; and
said third splice having an alignment substantially close to 45° between a major axis of polarization of said third fiber section and a major axis of polarization of said fourth fiber section.

3. The fiber optic gyroscope of claim 1, wherein
said second fiber section in the depolarizer region is coupled to said second IOC fiber pigtail via a fifth splice;
said fourth fiber section in the depolarizer region is coupled to said third IOC fiber pigtail via a sixth splice;
said fifth splice having an alignment substantially close to 0° between a major axis of polarization of said second fiber section and a major axis of polarization of said second piece of IOC fiber pigtail; and
said sixth splice having an alignment substantially close to 0° between a major axis of polarization of said fourth fiber section and a major axis of polarization of said third piece of IOC fiber pigtail.

4. The fiber optic gyroscope of claim 1, wherein a polarization axes of the first polarization maintaining fiber pigtail, the second polarization maintaining fiber pigtail and the third polarization maintaining fiber pigtail are aligned substantially with a waveguide polarization axis of the integrated optic circuit.

5. The fiber optic gyroscope of claim 1, wherein w is substantially equal to n*x, and n is an integer.

6. The fiber optic gyroscope of claim 5, wherein n=2.

7. The fiber optic gyroscope of claim 1, wherein x is substantially larger than 2000 $L_B$.

8. The fiber optical gyroscope of claim 1, wherein a differential group delay (DGD) of the single mode optical fiber loop is substantially less than 1.81 ps.

9. The fiber optical gyroscope of claim 1, wherein the broadband light source is substantially un-polarized at a point before coupling into the directional coupler.

10. The fiber optical gyroscope of claim 1, wherein the directional fiber coupler has a polarization dependent splitting ratio less than −0.30 dB.

11. The fiber optical gyroscope of claim 1, wherein polarization cross-coupling is less than −20 dB except at the first splice and the second splice.

12. An optical circuit for a fiber optic gyroscope having a broadband light source and a single mode optical fiber loop, the circuit comprising:
a polarization maintaining (PM) delay management fiber of length v, having a first end and a second end, wherein the first end of the polarization maintaining delay management fiber is coupled a directional coupler that receives light from the broadband light source;
an integrated optical circuit (IOC) having
the integrated optical circuit coupled to the second end of the polarization maintaining delay management fiber via a first polarization maintaining fiber pigtail of length $d_1$;

the integrated optical circuit coupled to a second polarization maintaining fiber pigtail with length of $d_2$; and the integrated optical circuit coupled to a third polarization maintaining fiber pigtail with length of $d_3$;

wherein the integrated optic circuit (IOC) comprises a polarization maintaining waveguide device having waveguide length of $L_{IOC}$ and comprise a polarizing element so that the total effective polarization extinction ratio (PER) of the integrated optic circuit is $\epsilon$; and a splitter that splits light received from the first polarization maintaining fiber pigtail into a first beam directed to the second polarization maintaining fiber pigtail and a second beam directed to the third polarization maintaining fiber pigtail; and a depolarizer circuit coupled to said fiber loop, said depolarizer circuit including a first optical fiber section of length x, a second optical fiber section of length z, a third optical fiber section of length w and a fourth optical fiber section of length y, each comprising polarization maintaining fibers having a beat length of $L_B$;

wherein the second optical fiber section is coupled to the first optical fiber section via a first splice, the first optical fiber section is coupled to a first end of the single mode optical fiber loop via a second splice, the fourth optical fiber section is coupled to the third optical fiber section via a third splice, and the third optical fiber section is coupled to a second end of the single mode optical fiber loop via a fourth splice; and wherein x+z is substantially equal to w+y;

wherein the lengths of v, x, y, $d_1$ and $d_3$ are proportioned to avoid regions of high bias instability defined by the expressions $v = x - (L_{IOC} + y + d_1 + d_3),$ $v = 2x - (L_{IOC} + y + d_1 + d_3),$ $v = 3x - (L_{IOC} + y + d_1 + d_3),$ and $v = 4x + y - (L_{IOC} + y + d_1 + d_3).$

13. The optical circuit of claim 12, wherein said first splice having an alignment substantially close to 45° between a major axis of polarization of said first fiber section and a major axis of polarization of said second fiber section; and said third splice having an alignment substantially close to 45° between a major axis of polarization of said third fiber section and a major axis of polarization of said fourth fiber section.

14. The optical circuit of claim 12, wherein said second fiber section in the depolarizer region is coupled to said second IOC fiber pigtail via a fifth splice;

said fourth fiber section in the depolarizer region is coupled to said third IOC fiber pigtail via a sixth splice;

said fifth splice having an alignment substantially close to 0° between a major axis of polarization of said second fiber section and a major axis of polarization of said second piece of IOC fiber pigtail; and said sixth splice having an alignment substantially close to 0° between a major axis of polarization of said fourth fiber section and a major axis of polarization of said third piece of IOC fiber pigtail.

15. The optical circuit of claim 12, wherein a polarization axes of the first polarization maintaining fiber pigtail, the second polarization maintaining fiber pigtail and the third polarization maintaining fiber pigtail are aligned substantially with a waveguide polarization axis of the integrated optic circuit.

16. The optical circuit of claim 12, wherein w is substantially equal to n*x, and n is an integer.

17. The optical circuit of claim 12, wherein n=2.

18. The optical circuit of claim 12, wherein x is substantially larger than 2000 $L_B$.

19. The optical circuit of claim 12, wherein a differential group delay (DGD) of the single mode optical fiber loop is substantially less than 1.81 ps.

20. The optical circuit of claim 12, wherein the directional fiber coupler has a polarization dependent splitting ratio less than −0.30 dB.

* * * * *